April 18, 1939. A L. WALLACE 2,154,791
STRIP GUIDE FOR MOLDING APPARATUS
Filed Sept. 17, 1936 2 Sheets-Sheet 2

A. L. Wallace INVENTOR.
BY Thomas Howe
ATTORNEY.

Patented Apr. 18, 1939

2,154,791

UNITED STATES PATENT OFFICE 2,154,791

STRIP GUIDE FOR MOLDING APPARATUS

Archibald L. Wallace, Northport, N. Y.

Application September 17, 1936, Serial No. 101,209

13 Claims. (Cl. 18—6)

This invention relates to means for guiding strips such as the steel strips interposed between the mold members and the work in vulcanizing the mold members and the work in vulcanizing machines although the guiding means may be employed for other uses.

The main object of the invention is to provide a strip guide which shall surely and accurately guide the strips into position.

A further object of the invention is to provide a rugged construction of strip guide.

A further object of the invention is to provide a strip guide which shall be readily assembled and disassembled with relation to the strips.

A further object of the invention is to provide removable means for taking the wear of the strips and preventing wear of the permanent portions of the guide.

A further object of the invention is to provide removable means for properly supporting the strips in the guide channels.

Other and ancillary objects of the invention will appear hereinafter.

In the accompanying drawings which illustrate the invention:

Fig. 6 is a fragmentary partial cross section of the strip guide, on an enlarged scale, on the line 6—6 of Fig. 1, showing liners and supporting strips in the strip channels;

Fig. 7 is a fragmentary longitudinal section, broken away from the remainder of the guide, at the delivery end of the guide;

Fig. 8 is a side elevation, partly broken away, of a flat supporting strip; and

Fig. 9 is a side elevation, partly broken away, of the liner of channel-shaped cross section.

Figure 1:
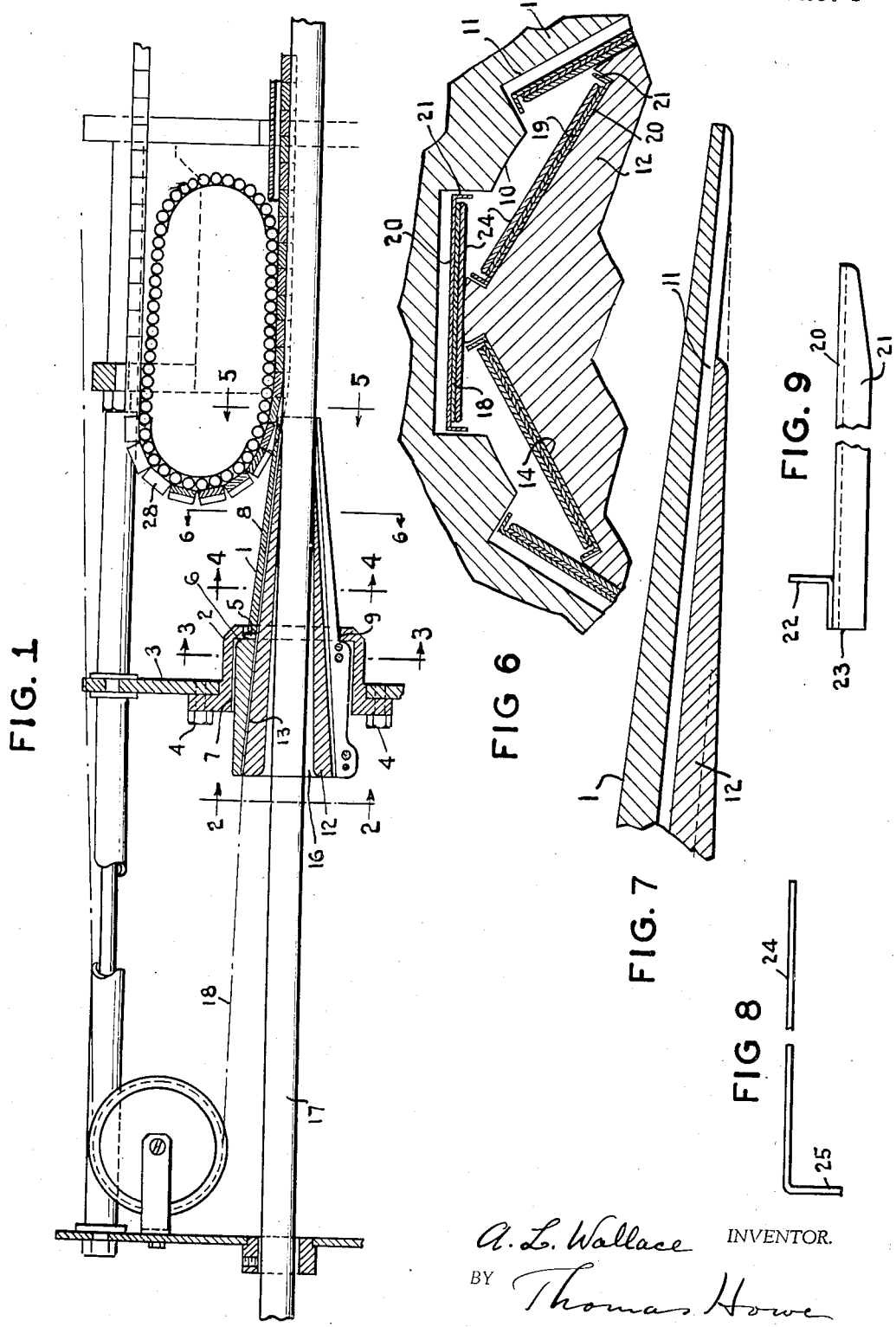
Fig. 1 is a side elevation of sufficient of the vulcanizing apparatus to show the application of the invention thereto, the strip guide being shown in section on the line 1—1 of Fig. 2.

Referring to the drawings, the strip guide comprises the outer member 1 projecting through an opening in the supporting member 2 which is secured to the stationary upright plate 3 of a vulcanizing machine by means of machine screws 4. The member 1 is prevented from turning with relation to the member 2 by means of a dowel pin 5 fixed in the member 1 and projecting into a recess in the member 2.

It will be observed that the outer member is provided with a shoulder 6 which limits the movement of the guide toward the right (Fig. 1) by coming against the member 2. It is further to be observed that within the member 2 and about the member 1 is a clearance 7 and that by reason of the taper 8 on the outer surface of the member 1 there is a clearance 9 about the member 1 and between it and the sides of the hole in the member 2, the member 1 making substantially only a line contact with the left-hand edge of the hole in the member 2 through which it passes, whereby the guide may more readily adjust itself in its support, to variable conditions during the operation of the machine.

The interior surface 10 of the exterior member 1 of the guide is tapered, the diameters growing smaller toward the right (Fig. 1) and such surface is provided with the equi-distantly spaced strip channels 11 which are of substantially the same width throughout their length and extend in substantially straight lines from one end to the other of the member 1.

Within the member 1 is an interior member 12 having its exterior surface 13 tapered to correspond to the taper of the interior surface of the member 1 and fitting therein, such interior member 12 having upon its exterior surface the equi-distantly spaced grooves or channels 14 extending substantially the length of the member 12 in substantially straight lines and being of substantially uniform width. It will be noted that the slots 14 are staggered with relation to, that is are not in registry with, the slots 11. The members 1 and 12 are held against relative turning by means of a key 15.

Figure 5:
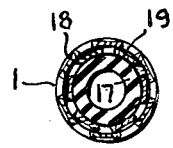
Fig. 5 is an end view, on an enlarged scale, of the delivery end of the guide as viewed from the line 5—5 of Fig. 1, the hose and strips about the same being shown in section on that line.

The member 12 is provided with a central opening 16 through which the rubber hose 17 to be vulcanized, or other work, may pass. The small end of the strip guide bears more or less tightly upon the surface of the hose 17 so that the flat steel strips as 18 passing through the channels 11 are guided into a layer upon the hose which overlies a layer of similar strips 19 lying directly against the hose and guided thereto through the channels 14 (see Fig. 5).

Figure 2:
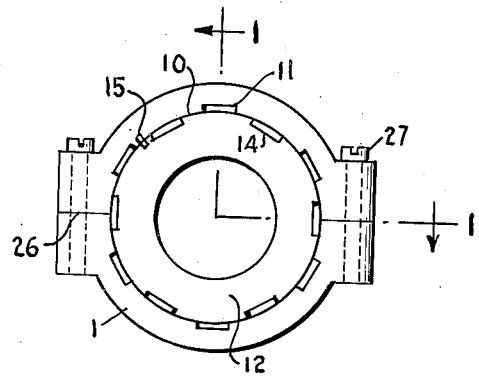
Fig. 2 is an end elevation, on an enlarged scale, of the strip guide viewed from the line 2—2 of Fig. 1.
Figure 3:
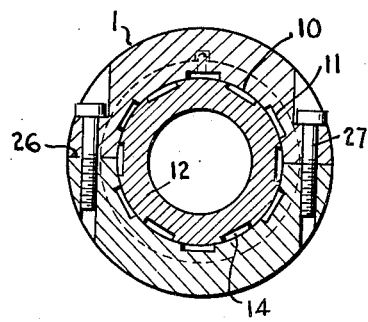
Fig. 3 is a section, on an enlarged scale, of the strip guide on the line 3—3 of Fig. 1.
Figure 4:
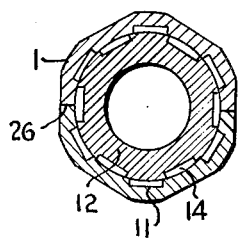
Fig. 4 is a section, on an enlarged scale, on the line 4—4 of Fig. 1.

It will be observed that at the large end of the guide (see Fig. 2) the strip channels 11 and 14 in the members 1 and 12 respectively, are separated from each other circumferentially of the guide. As these slots progress down the tapered surfaces, however, they will, as they approach the small end, converge nearer and nearer together, thus the slots are less distances apart at the section 3—3 (see Fig. 3), they are still closer together at the section 4—4 (see Fig. 4), and in the view as shown in Fig. 6 the slots overlap each other so that the metal strips 18 proceed through the slots 11 to form the outer layer (Fig. 5), and the strips 19 fed through the slot 14 on the interior member form the inner layer (see Fig. 5), the strips of each layer extending across or breaking the joints between the strips of the other layer so that a complete enclosure of the hose to be operated upon is secured.

The edges of the steel strips passing through the channels in the members 1 and 12 may cause wear of the sides of the channels whereby the strips might become thrown out of adjustment or slots formed in the sides of the channel in which the strips might become stuck or retarded. To avoid this a channel-shaped liner 20 is inserted in each channel, the metal strip for application to the hose being passed through the liner, the side portions 21 of the liner taking the wear from the edge of the steel strip. Upon undue wear of a metal liner it may be removed and a new liner inserted. Each liner is inserted in its channel from the large end of the strip guide and extends substantially the entire length of the channel. Also each liner is provided with a laterally extending projection 22 (see Fig. 9) which acts as a stop, coming against the end of the guide, to limit the insertion of the guide into the channel so that it will not be pushed in too far and it will indicate when it has been inserted to the proper degree. The end 23 of the liner projects beyond the end of the guide and is conveniently gripped by the fingers to withdraw the liner from the guide.

Also to support the steel strip which is applied to the hose, particularly when the open side of a channel in one member is not closed by the other member (see for instance Fig. 6) a flat supporting strip 24 having a lateral projection 25, which comes against the end of the guide to limit the insertion of the supporting strip into the guide, is inserted in the channel adjacent the steel strip to be applied to the hose, and upon the opposite side thereof from the liner referred to. This provides a broad and secure support whereby the steel strip for application to the hose is held in proper position in the channel at all times, the utility of this strip being particularly apparent from the conditions as exhibited in Fig. 6.

In order to facilitate the assembly of the guide in relation to the steel strips to be applied to the hose, particularly when such strips are endless as is usually the case in vulcanizing apparatus, the outer member 1 of the guide is divided longitudinally at 26 throughout its length and the parts are secured together by the machine screws 27. With this construction the inner member 12 of the strip guide may be placed in position within the strips after which the two halves of the outer member 1 may be placed in position about the outsides of the strips and the whole may then be clamped together by the screws 27. In disassembling the guide from the strips these screws can be removed, the outer guide member removed from the strips and the inner member removed from its position within the strips.

The smaller end or nose of the guide may be positioned close to the point where the endless series of mold members 28 press the strips against the rubber hose to be vulcanized so that there is no opportunity for the steel strips to become displaced between the point at which they leave the guide and that at which they are held in position by the mold members pressing the strips against the hose.

The strips would ordinarily be moved in the direction from left to right (Fig. 1). Only so much of the vulcanizing apparatus is herein exhibited as is necessary to show the relation of the strip guide thereto, such apparatus may be as shown in my application Serial No. 11,395, filed March 16, 1935, the present invention relating to a strip guide which is an improvement upon the strip guide shown in my application referred to.

While the invention has been illustrated in what is considered its best application it may have other embodiments without departing from its spirit and is not therefore limited to the structures shown in the drawings.

What I claim is:

1. In a machine of the class described, such as a vulcanizing machine, and in combination, a strip-guide member having a tapering interior surface with strip channels in said surface and an interior member within the first mentioned member and having a tapered exterior surface adapted to hold the strips in said channels, said interior member having a central opening for passage of the work, and a plurality of strips movable lengthwise in said strip channels and adapted to delimit the circumferential boundaries of the work with progressive convergence.

2. In a machine of the class described, such as a vulcanizing machine and in combination, a strip-guide member having a tapering interior surface and an interior member within the first mentioned member having a tapered exterior surface with strip channels therein, said interior member having a central opening for passage of the work, and a plurality of complemental strips movable lengthwise in said strip channels and adapted to delimit the circumferential boundaries of the work progressively.

3. In a machine of the class described, such as a vulcanizing machine, and in combination, a strip-guide member having a tapering interior surface with strip channels within said surface and an interior member within the first mentioned member and having a tapered exterior surface with strip channels therein, said interior member having a central opening for passage of the work, and a plurality of complemental strips in said channels of said interior surface and exterior surface respectively, said strips being movable lengthwise to cooperate in delimiting the circumferential boundaries of said work progressively.

4. A machine having the features claimed in claim 3, in which the said strip channels are staggered.

5. In a machine of the class described, such as a vulcanizing machine, in combination, a strip-guide member having a tapering interior surface with strip channels in said surface, strips in said channels and an interior member within the first mentioned member and having a tapered exterior surface adapted to hold the strips in said channels, said interior member having a central opening for passage of the work, the first mentioned member comprising a plurality of longitudinally divided parts and means for securing said parts together.

6. In a machine of the class described, such as a vulcanizing machine and in combination, a strip-guide member having a tapering interior surface with strip channels in said surface and an interior member within the first mentioned member and having a tapered exterior surface adapted to hold the strip in said channels and one or more liners in said channels, said interior member having a central opening for passage of the work.

7. In a machine of the class described, such as a vulcanizing machine, and in combination, a strip-guide member having a tapering interior surface and an interior member within the first mentioned member having a tapered exterior surface with strip channels therein, and one or more liners in said exterior surface channels of said interior member, said interior member having a central opening for passage of the work.

8. In a machine of the class described, such as a vulcanizing machine, and in combination: a strip-guide member having a tapering interior surface with strip channels within said surface and an interior member within the first mentioned member and having a tapered exterior surface with strip channels therein, said interior member having a central opening for passage of the work, a liner in each of said channels, and a strip movable lengthwise in each of said lines to delimit the boundaries of said work.

9. In a machine of the class described, such as a vulcanizing machine, and in combination: a strip-guide member having a tapering interior surface with strip channels in said surface and an interior member within the first mentioned member and having a tapered exterior surface adapted to hold the strips in said channels and one or more liners in said channels, said one or more liners each having a lateral projection engaging the guide to limit the inward movement of the liner in the guide and said interior member having a central opening for passage of the work.

10. In a machine of the class described, such as a vulcanizing machine, and in combination: a strip-guide member having a tapering interior surface with strip channels within said surface and an interior member within the first mentioned member and having a tapered exterior surface with strip channels therein and channel-shaped liners in said channels, said interior member having a central opening for passage of the work.

11. In a machine of the class described, such as a vulcanizing machine, and in combination: a strip-guide member having a tapering interior surface with strip channels in said surface and an interior member within the first mentioned member and having a tapered exterior surface with strip channels therein, strips in said channels for enclosing the work during vulcanizing and one or more supporting strips in said channels for supporting said work-enclosing strips, said interior member having a central opening for passage of the work.

12. In a machine of the class described, such as a vulcanizing machine, and in combination: a strip-guide member having a tapering interior surface with strip channels within said surface and an interior member within the first mentioned member and having a tapered exterior surface with strip channels therein, said interior member having a central opening for passage of the work and a supporting strip and a channel-shaped liner in each of one or more of said channels.

13. In a machine of the class described, such as a vulcanizing machine, and in combination, a strip-guide having a member having a tapering interior surface and an interior member within the first mentioned member, having a tapered exterior surface with strip channels therein, and a liner in each of said channels, said liners each having a lateral projection engaging the guide to limit the movement of the liner in the guide and said interior member having a central opening for passage of the work.

ARCHIBALD L. WALLACE.